US010832436B2

(12) United States Patent
Lam et al.

(10) Patent No.: US 10,832,436 B2
(45) Date of Patent: Nov. 10, 2020

(54) METHOD, SYSTEM AND APPARATUS FOR RECOVERING LABEL POSITIONS

(71) Applicant: SYMBOL TECHNOLOGIES, LLC, Lincolnshire, IL (US)

(72) Inventors: Joseph Lam, North York (CA); Vlad Gorodetsky, North York (CA); Richard Jeffrey Rzeszutek, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 112 days.

(21) Appl. No.: 15/945,926

(22) Filed: Apr. 5, 2018

(65) Prior Publication Data

US 2019/0311489 A1 Oct. 10, 2019

(51) Int. Cl.
*G06K 9/00* (2006.01)
*G06T 7/70* (2017.01)
*G06T 7/13* (2017.01)
*G06Q 10/08* (2012.01)

(52) U.S. Cl.
CPC ............ *G06T 7/70* (2017.01); *G06K 9/00664* (2013.01); *G06T 7/13* (2017.01); *G06Q 10/087* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 5,199,084 | A | * | 3/1993 | Kishi ................. G06K 7/10861 209/583 |
| 5,209,712 | A | | 5/1993 | Ferri |
| 5,214,615 | A | | 5/1993 | Bauer |
| 5,408,322 | A | | 4/1995 | Hsu et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

International Search Report and Written Opinion for International Patent Application No. PCT/US2013/070996 dated Apr. 2, 2014.

(Continued)

*Primary Examiner* — Hadi Akhavannik

(57) ABSTRACT

A method of recovering label positions in an imaging controller includes: receiving (i) a definition of a plane containing edges of the shelf, and (ii) a plurality of initial label indicators having locations on the plane; assigning the initial label indicators among a plurality of candidate subsets each representing a single physical label; for each candidate subset of initial indicators: generating, for each of a plurality of projection depths relative to the plane, a set of projections of the initial indicators in the candidate subset; determining an aggregate surface area for each set of projections; selecting, as a recovered depth for the candidate subset, one of the projection depths corresponding to the minimum aggregate surface area; and generating a recovered position for the candidate subset based on the recovered depth; and storing the recovered positions.

18 Claims, 11 Drawing Sheets

(56) References Cited

U.S. PATENT DOCUMENTS

| | | |
|---|---|---|
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |

(56) References Cited

U.S. PATENT DOCUMENTS

| | | |
|---|---|---|
| 2008/0242971 A1* | 10/2008 | Klingenbeck-Regn ............... A61B 90/11 600/407 |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1* | 4/2015 | Patel .................. G06Q 10/087 382/199 |
| 2015/0139010 A1 | 5/2015 | Jeong et al. |
| 2015/0154467 A1 | 6/2015 | Fang et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |

(56) References Cited

U.S. PATENT DOCUMENTS

| | | |
|---|---|---|
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1* | 6/2016 | Schwartz ............ G06K 9/00201 382/103 |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0253735 A1 | 9/2016 | Scudillo et al. |
| 2016/0292533 A1* | 10/2016 | Uchiyama ............ H04N 13/366 |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1* | 2/2017 | Rizzolo ............... G06Q 20/201 |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0103515 A1* | 4/2017 | Hulth ................. G06K 9/00771 |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1* | 10/2017 | Skaff .................... G05D 1/0246 |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0204111 A1 | 7/2018 | Zadeh et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0180150 A1 | 6/2019 | Taylor et al. |
| 2019/0197728 A1 | 6/2019 | Yamao |

FOREIGN PATENT DOCUMENTS

| | | |
|---|---|---|
| CN | 104200086 | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 A2 | 11/2013 |
| EP | 2693362 | 2/2014 |
| GB | 223238 A | 9/1998 |
| GB | 2330265 A | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | 2003025805 A1 | 3/2003 |
| WO | 2006136958 A3 | 12/2006 |
| WO | 2007042251 A2 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | 2014181323 A1 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

International Search Report and Written Opinion for International Patent Application No. PCT/US2013/053212 dated Dec. 1, 2014.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
Bohm, "Multi-Image Fusion for Occlusion-Free Facade Texturing", International Archives of the Photogrammetry, Remote Sensing and Spatial Information Sciences, pp. 867-872 (Jan. 2004).
Senthilkumaran, et al., "Edge Detection Techniques for Image Segmentation—A Survey of Soft Computing Approaches", International Journal of Recent Trends in Engineering, vol. 1, No. 2 (May 2009).
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).
Tseng, et al., "A Cloud Removal Approach for Aerial Image Visualization", International Journal of Innovative Computing, Information & Control, vol. 9 No. 6, pp. 2421-2440 (Jun. 2013).
United Patent Kingdom Intellectual Property Office, Combined Search and Examination Report dated Mar. 11, 2015 for GB Application No. 1417218.3.
United Kingdom Intellectual Property Office, Examination Report dated Jan. 22, 2016 for GB Patent Application No. 1417218.3 (2 pages).
United Kingdom Intellectual Property Office, Combined Search and Examination Report dated Jan. 22, 2016 for GB Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,717, filed May 1, 2017.
U.S. Appl. No. 15/583,801, filed May 1, 2017.
U.S. Appl. No. 15/583,740, filed May 1, 2017.
U.S. Appl. No. 15/583,759, filed May 1, 2017.
U.S. Appl. No. 15/583,773, filed May 1, 2017.

(56) References Cited

OTHER PUBLICATIONS

U.S. Appl. No. 15/583,680, filed May 1, 2017.
U.S. Appl. No. 15/583,786, filed May 1, 2017.
International Patent Application Serial No. PCT/CN2017/083143 filed May 5, 2017.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for widebaseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.

(56) References Cited

OTHER PUBLICATIONS

"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D Lidar point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, Sep. 25-27, 2013.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.

\* cited by examiner

Projection depth: 0 cm

Projection depth: 10 cm

Projection depth: 20 cm

Projection depth: 30 cm

METHOD, SYSTEM AND APPARATUS FOR RECOVERING LABEL POSITIONS

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment. Certain objects, such as labels, may be particularly difficult to detect accurately due to their small size and placement on or near other structures such as shelf edges.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
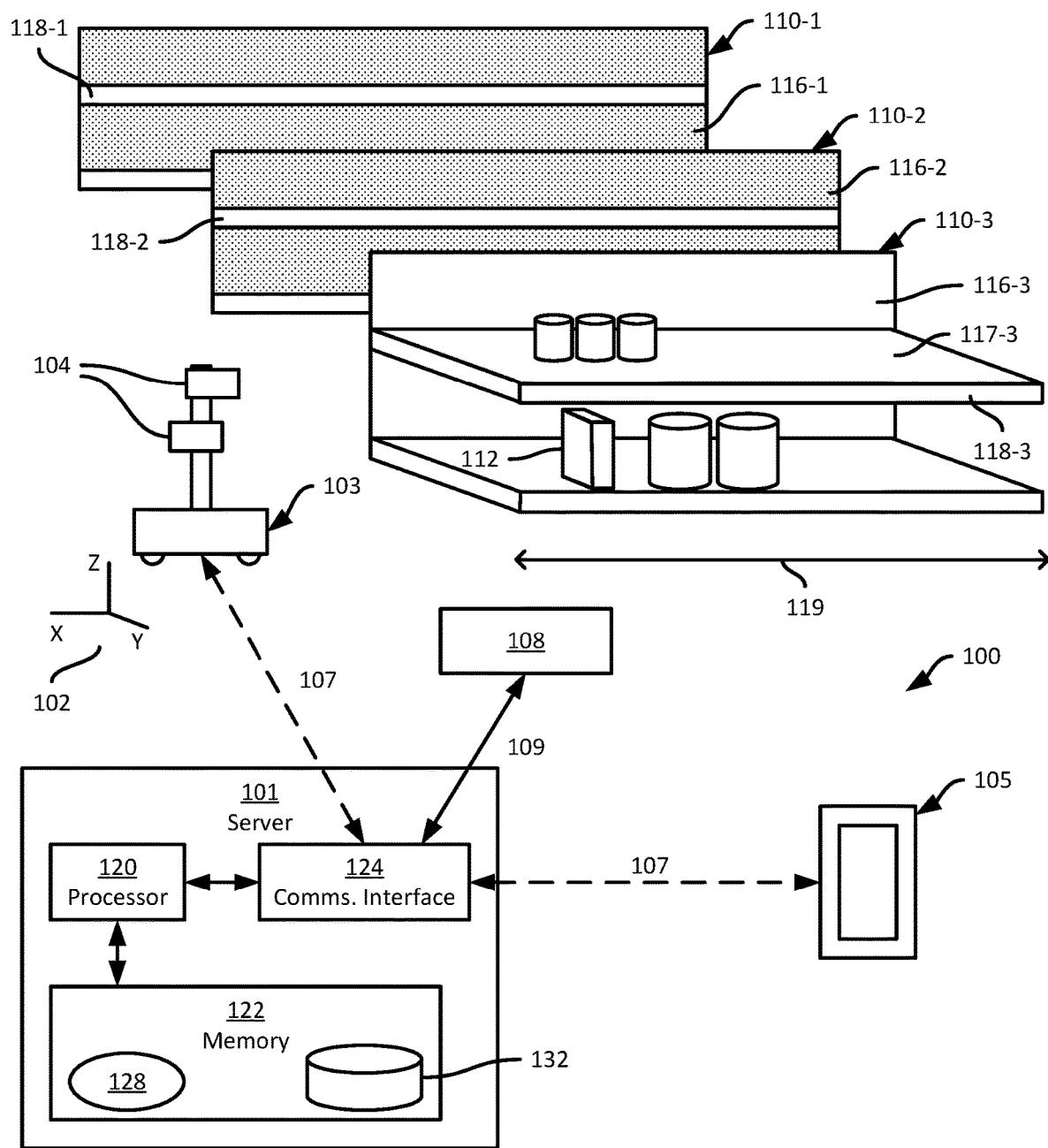
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of recovering label positions in an imaging controller, the method comprising: receiving (i) a definition of a plane containing edges of a support structure, and (ii) a plurality of initial label indicators having locations on the plane; assigning the initial label indicators among a plurality of candidate subsets of label indicators, each candidate subset representing a single physical label; for each candidate subset of initial label indicators: generating, for each of a plurality of projection depths relative to the plane, a set of projections of the initial label indicators in the candidate subset; selecting, as a recovered depth for the candidate subset, one of the projection depths based on the sets of projections; and generating a recovered position for the candidate subset based on the recovered depth; and storing the recovered positions.

Additional examples disclosed herein are directed to a computing device for recovering label positions, comprising: a memory; and an imaging controller connected to the memory, the imaging controller configured to: receive (i) a definition of a plane containing edges of a support structure, and (ii) a plurality of initial label indicators having locations on the plane; assign the initial label indicators among a plurality of candidate subsets of label indicators, each candidate subset representing a single physical label; for each candidate subset of initial label indicators: generate, for each of a plurality of projection depths relative to the plane, a set of projections of the initial label indicators in the candidate subset; select, as a recovered depth for the candidate subset, one of the projection depths based on the sets of projections; and generate a recovered position for the candidate subset based on the recovered depth; and the imaging controller further configured to store the recovered positions in the memory.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. In other examples, the environment can include additional support structures (e.g. tables, pegboards and the like) in addition to or instead of the shelf modules 110.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. The apparatus 103 is configured to perform such navigation relative to a frame of reference 102 established within the retail environment.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like), and is further configured to employ the sensors 104 to capture shelf data. In the present example, the apparatus 103 is configured to capture image data and depth measurements (defining a distance from a depth sensor on the apparatus 103 to a point on the shelf 110, such as a product 112, a shelf back 116 or the like) corresponding to the shelves 110.

The server 101 includes a special purpose imaging controller, such as a processor 120, specifically designed to control the mobile automation apparatus 103 to capture data (e.g. the above-mentioned images and depth measurements). The processor 120 is further configured to obtain the captured data via a communications interface 124 and store the captured data in a repository 132 in a memory 122 connected with the processor 120. The server 101 is further configured to perform various post-processing operations on the captured data, which can include registering the captured data to the frame of reference 102 based on recorded data indicating positions of the apparatus 103 at the time of capture, as well as on calibration data defining relationships between image and depth sensors on the apparatus 103. The process of registering the captured data to the frame of reference is referred to herein as back-projecting. As will be discussed below in greater detail, the post-processing functions performed by the server 101 include the recovery of positional data corresponding to labels placed on the shelves 110 from the captured data.

The server 101 can also be configured to determine product status data (e.g. to detect gaps on the shelves 110), and to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein, including the above-mentioned recovery of label positions. The applications stored in the memory 122 include a control application 128, which may also be implemented as a suite of logically distinct applications. In general, via execution of the control application 128 or subcomponents thereof and in conjunction with the other components of the server 101, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more FPGAs and/or Application-Specific Integrated Circuits (ASICs)) rather than by execution of the control application 128 by the processor 120.

Figure 2A:
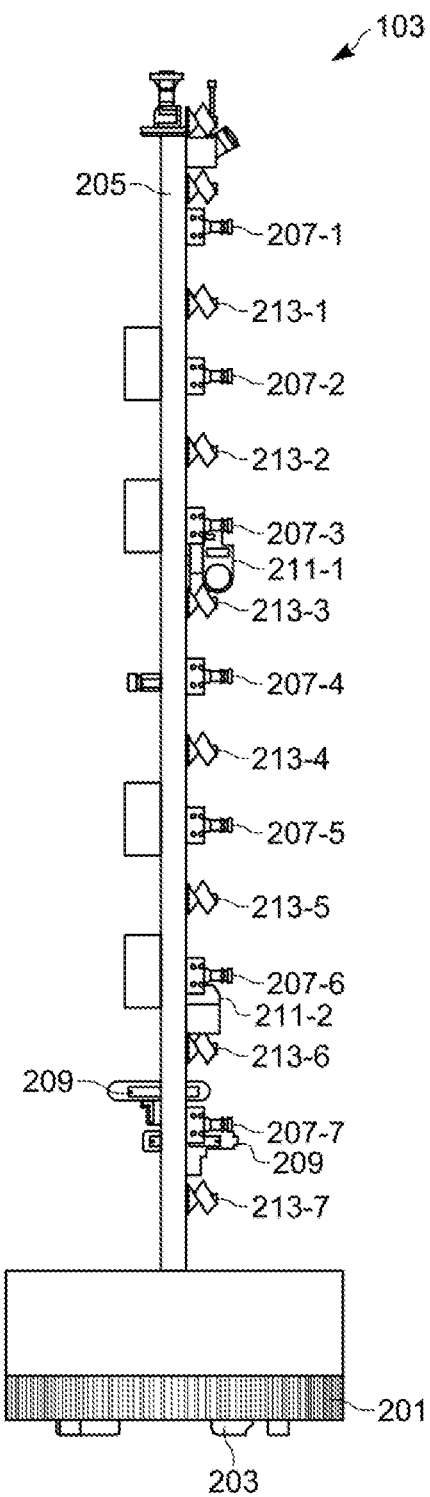
FIG. 2A depicts a mobile automation apparatus in the system of FIG. 1.
Figure 2B:
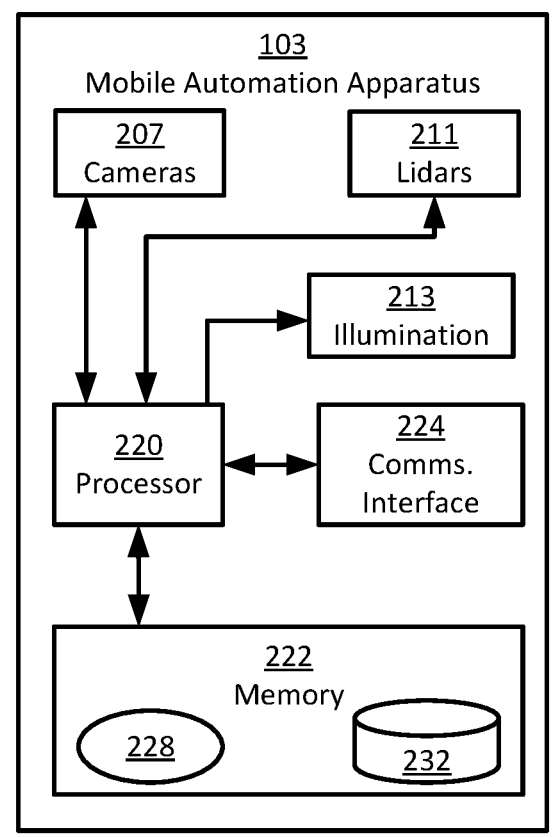
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201), for example in the frame of reference 102 previously established in the retail facility, permitting data captured by the mobile automation apparatus to be registered to the frame of reference 102.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 203) and the collection of data (e.g. image data and/or depth measurements) representing the shelves 110. The application 228 may also be implemented as a suite of distinct applications in other examples.

The processor 220, when so configured by the execution of the application 228, may also be referred to as a controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

In the present example, as discussed below, one or both of the server 101 (as configured via the execution of the control application 128 by the processor 120) and the mobile automation apparatus 103 (as configured via the execution of the application 228 by the processor 220), are configured to process image and depth data captured by the apparatus 103 to recover label positions (e.g. in the frame of reference 102) from the captured data. The label positions may be stored for use in downstream processing, such as price verification, product status detection (e.g. to detect a product 112 that does not match a nearby label), and the like.

In further examples, the data processing discussed below may be performed on a computing device other than the server 101 and the mobile automation apparatus 103, such as the client device 105. The data processing mentioned above will be described in greater detail in connection with its performance at the server 101, via execution of the application 128.

Figure 3:
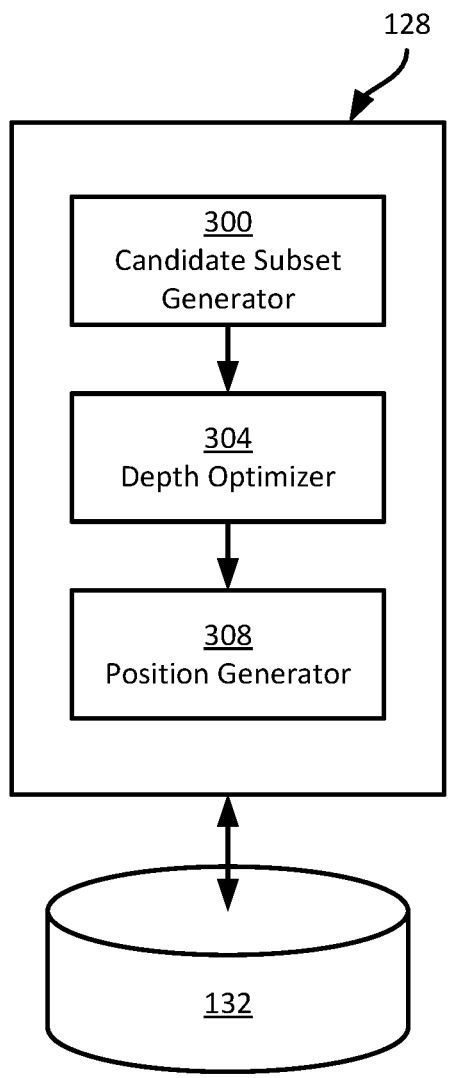
FIG. 3 is a block diagram of certain internal components of the server of FIG. 1.

Turning now to FIG. 3, before describing the operation of the application 128 to correct translucency artifacts in depth data captured by the apparatus 103, certain components of the application 128 will be described in greater detail. As will be apparent to those skilled in the art, in other examples the components of the application 128 may be separated into distinct applications, or combined into other sets of components. Some or all of the components illustrated in FIG. 3 may also be implemented as dedicated hardware components, such as one or more ASICs or FPGAs.

The control application 128 includes a candidate subset generator 300 configured to obtain input data including initial label indicators. The initial label indicators indicate the positions of labels in the frame of reference 102, but may be affected by various sources of error. Further, each physical label on the shelves 110 may be depicted by more than one initial label indicator, for captured in successive frames of image and depth data. The candidate subset generator 300 is configured to assign the initial label indicators into candidate subsets each representing a single physical label on the shelves 110.

The control application 128 also includes a depth optimizer 304 configured to select a recovered depth for each of the candidate subsets of initial label indicators. The recovered depth seeks to mitigate or eliminate some of the above-mentioned sources of error and thus represent a more accurate depth for the underlying physical label than that defined by the initial label indicators.

The control application 128 also includes a position generator 308, configured to generated recovered positions for each of the candidate subsets of initial label indicators. The recovered positions may be stored in the repository 132 for further processing. For example, the recovered positions may be provided to a further application at the server 101, for assessing planogram compliance (e.g. whether the labels are in positions complying with a planogram stored in the repository 132).

Figure 4:
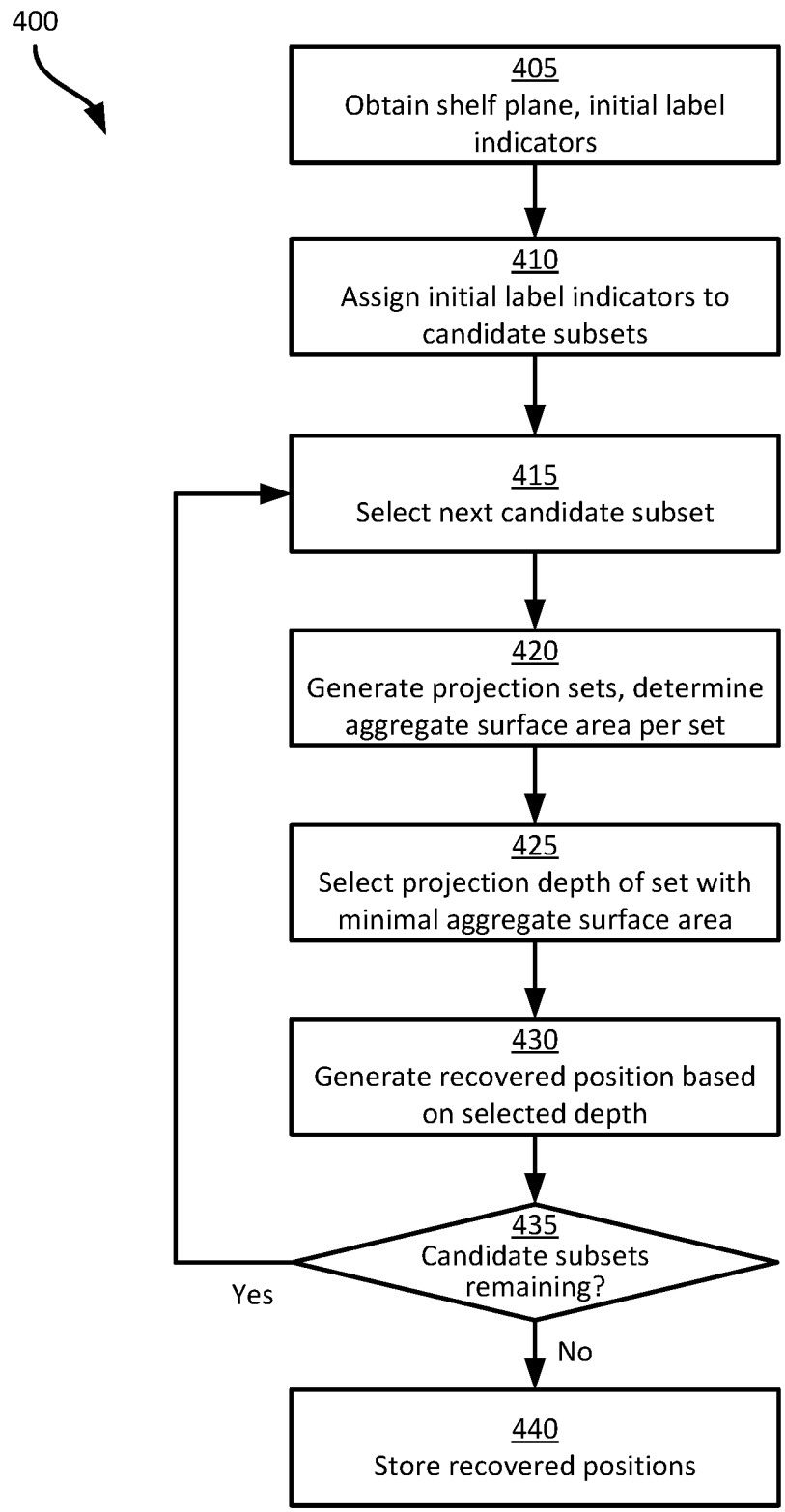
FIG. 4 is a flowchart of a method of recovering label positions.

The functionality of the control application 128 will now be described in greater detail. Turning to FIG. 4, a method 400 of recovering label positions in captured data depicting the shelves 110 is shown. The method 400 will be described in conjunction with its performance on the system 100, and specifically with reference to the components of the server 101 illustrated in FIG. 3.

At block 405, the server 101, and in particular the candidate subset generator 300 of the application 128 (as executed by the processor 120), is configured to obtain the input data employed through performance of the method 400 to generate recovered label positions. The input data includes a representation of a shelf plane. The shelf plane is a plane containing shelf edges (e.g. the edges 118 shown in FIG. 1), and may be generated by a shelf plane detector executed by the processor 120 itself or by another computing device. An example shelf plane detector can be configured to process depth measurements of the modules 110 or 510 (e.g. captured by the apparatus 103 with the depth sensor 209) to select a subset of the depth measurements indicative of shelf edges (e.g. indicative of substantially vertical surfaces), and to fit a shelf plane to the selected depth measurements. The plane definition obtained at block 405 can include an equation, a set of vectors or the like defining the plane, for example according to the frame of reference 102.

The server 101 is also configured to obtain, at block 405, a plurality of initial label indicators indicating the position of labels detected in the data captured by the apparatus 103 depicting the shelves 110. Each initial label indicator includes at least a location (e.g. in the frame of reference 102). Each initial label indicator can also include data decoded or otherwise retrieved from the label, such as a string decoded from a barcode printed on the corresponding label, a price recognized (e.g. via optical character recognition, OCR) from the label, and the like. The initial label indicators may be previously generated via the execution of a label detector by the server 101 or another computing device. An example label detector can be configured to process images of the modules 110 or 510 (e.g. captured by the apparatus 103 with the cameras 207) to generate a feature mask indicating locations in the images that contain certain predefined features (e.g. barcodes, blocks of text or the like). The label detector can then be configured to identify locations within the feature mask that match predefined label templates, indicating the likely presence of a label. Label indicators can then be generated from the above-mentioned locations, for example as bounding boxes.

As will be seen below in greater detail, at block 405 the server 101 can also be configured to obtain data indicating the locations of shelf edges (e.g. the edges 118). The locations of the shelf edges are, in the present example, obtained as bounding boxes (e.g. defined by coordinates in the frame of reference 102 and falling within the plane mentioned above). The shelf edge locations may be previously generated via the execution of a shelf structure detector by the server 101 or another computing device. An example shelf edge detector can, for example, process images of the modules 110 or 510 (e.g. captured by the apparatus 103 with the cameras 207) to identify intensity transitions (transitions from light to dark and from dark to light) indicative of shelf edges, which are indicative of shelf edges. The shelf edge detector can produce bounding boxes corresponding to the regions (i.e. the likely shelf edges) bounded by such transitions.

As noted above, example processes for the generation of the above-mentioned data are set out in Applicant's co-pending applications, and are therefore not discussed in detail herein. In the present example performance of the method 400, the server 101 performs block 405 by retrieving the shelf plane, initial label indicators, and optionally the shelf edge indicators, from the repository 132, the input data having been previously stored in the repository following upstream processing of data captured by the apparatus 103.

Figure 5A:
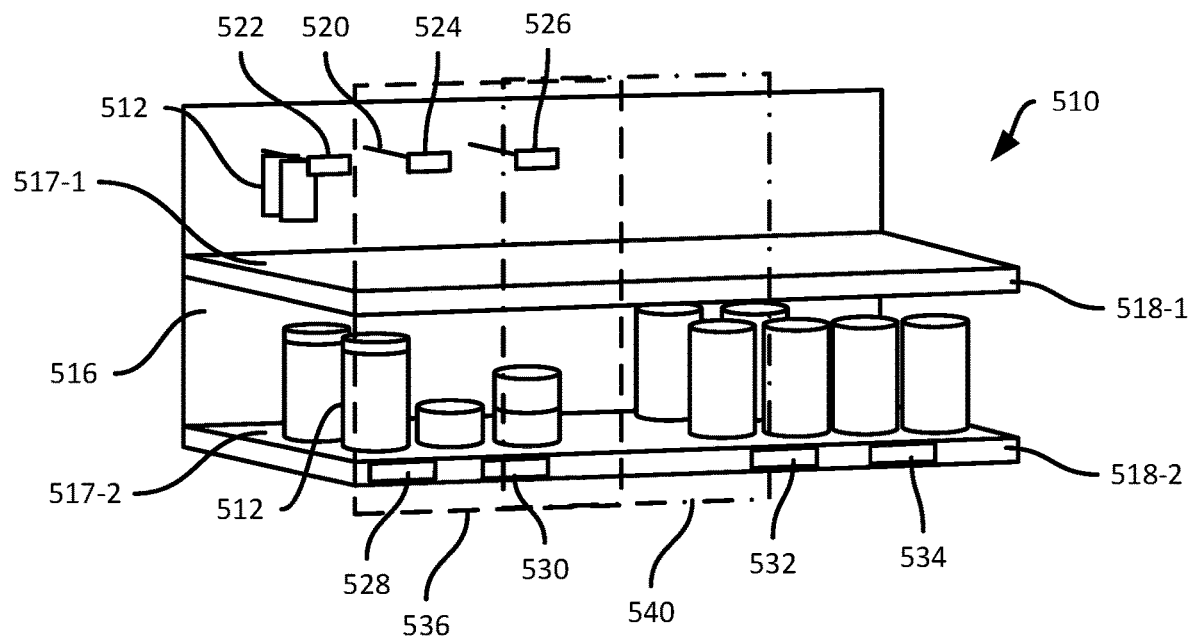
FIG. 5A depicts an example shelf arrangement.
Figure 5B:
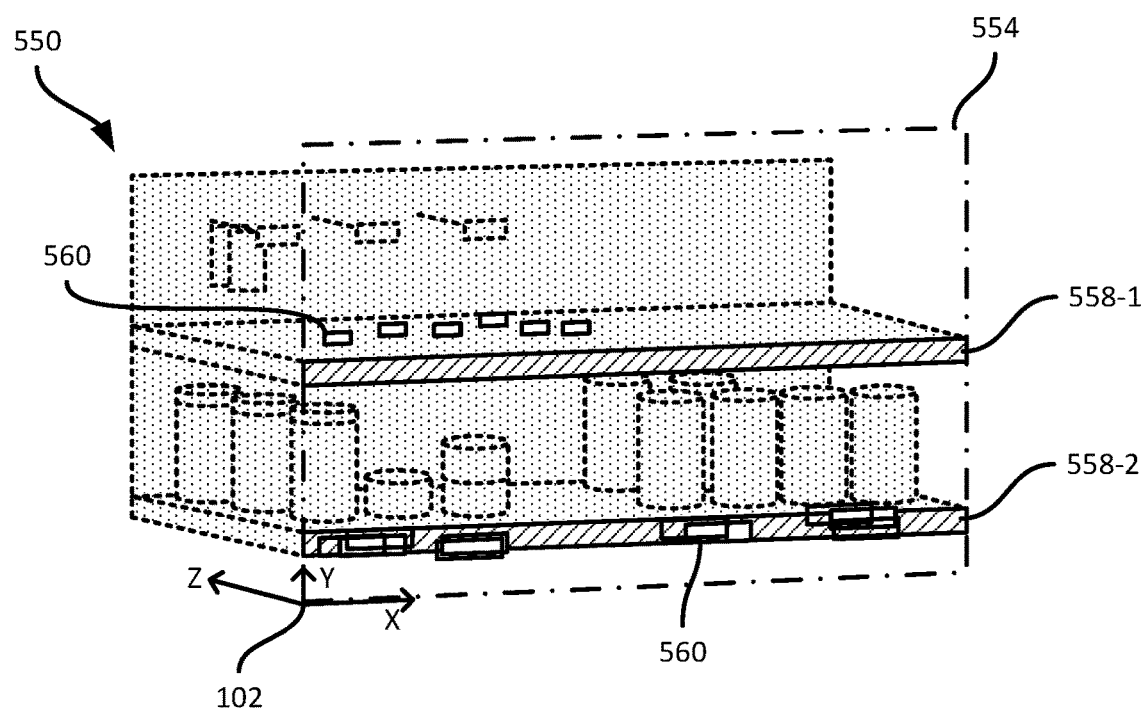
FIG. 5B depicts captured data and initial label indicators corresponding to the shelf of FIG. 5A.

Although the generation of the above-mentioned input data is not discussed in detail, a brief summary of an example mechanism for generation of the input data from data captured by the apparatus 103 is provided with reference to FIGS. 5A and 5B.

Turning to FIG. 5A, an example shelf module 510 is illustrated. The module 510 includes a shelf back 516 extending between a pair of support surfaces 517-1 and 517-2 (and also above the support surface 517-2). The support surfaces 517 include respective edges 518-1 and 518-2. The support surface 517-2 is shown supporting a plurality of objects 512, such as products in a retail environment. Although the support surface 517-1 is shown as not directly supporting any objects, the shelf back 516 supports a plurality of pegs 520, each of which may support additional products 512 above the support surface 517-1.

The module 510 includes a plurality of labels, each corresponding to a portion of the products 512. In the illustrated example, the pegs 520 bear respective labels 522, 524 and 526. In addition, the shelf edge 518-2 bears labels 528, 530, 532 and 534. The data capture apparatus 103 can be configured (e.g. via instructions issued from the server 101) to traverse the module 510 and capture a plurality of images of the module 510. Two examples portions of the module 510 captured by respective image frames are illustrated as frames 536 and 540 in FIG. 5A. As seen in FIG. 5A, the frames 536 and 540 overlap, and each portion of the module 510 is therefore depicted in more than one frame captured by the apparatus 103. The apparatus 103 is also configured to capture depth measurements while traversing the module 510.

Turning to FIG. 5B, a point cloud 550 obtained from the above-mentioned depth measurements is illustrated. In addition to the point cloud, a shelf plane 554 (e.g. generated by the above-mentioned shelf plane detector) is illustrated, as well as shelf edge indicators 558-1 and 558-2 indicating the detected location of the shelf edges 518-1 and 518-2 in the plane 554. Also shown in FIG. 5B are a plurality of initial label indicators referenced generally by the numeral 560 (more detailed discussion of the label indicators will be provided below).

As will be apparent to those skilled in the art, the initial label indicators 560 are greater in number than the physical labels present on the module 510, as shown in FIG. 5A. In the present example, the initial label indicators are detected from image data captured by the apparatus 103. As noted above, the image frames captured by the apparatus 103 overlap, and therefore each of the labels 522 to 534 is typically detected in more than one image. All label detections are stored in the repository 132, and thus each label is represented in the input data obtained at block 405 by a plurality of initial label indicators.

As will also be apparent to those skilled in the art, the label indicators include various positional errors. Such errors arise from variations in image quality between the above-mentioned image frames, variations in label detection accuracy, and the like. In addition, the initial label indicators 560 corresponding to the labels 522, 524 and 526 include additional positional errors resulting from their placement on the plane 554 (when the labels 522, 524 and 526 themselves are not at the same depth as the shelf edges 518). The erroneous placement of such label indicators may result from an assumption taken by the label detector noted above that all labels are in the same plane as the shelf edges 518. Such assumptions may result from the difficult of accurately detecting the true depth of the labels from the depth measurements captured by the apparatus 103, due to the small size of the labels. In other words, rather than attempting to detect a depth for the labels, the label detector may operate solely on image data, and the two-dimensional positions of detected labels within each image frame is transformed into a three-dimensional position in the frame of reference 102 by back-projecting the two-dimensional positions onto the plane 554. The back-projection is based, in the present example, on the stored location of the apparatus 103 at the time of capture of each image frame, as well as on Performance of the remainder of the method 400 permits the server 101 to recover unique label positions for each physical label, that may have greater accuracy than the initial indicators shown in FIG. 5B.

Figure 6:
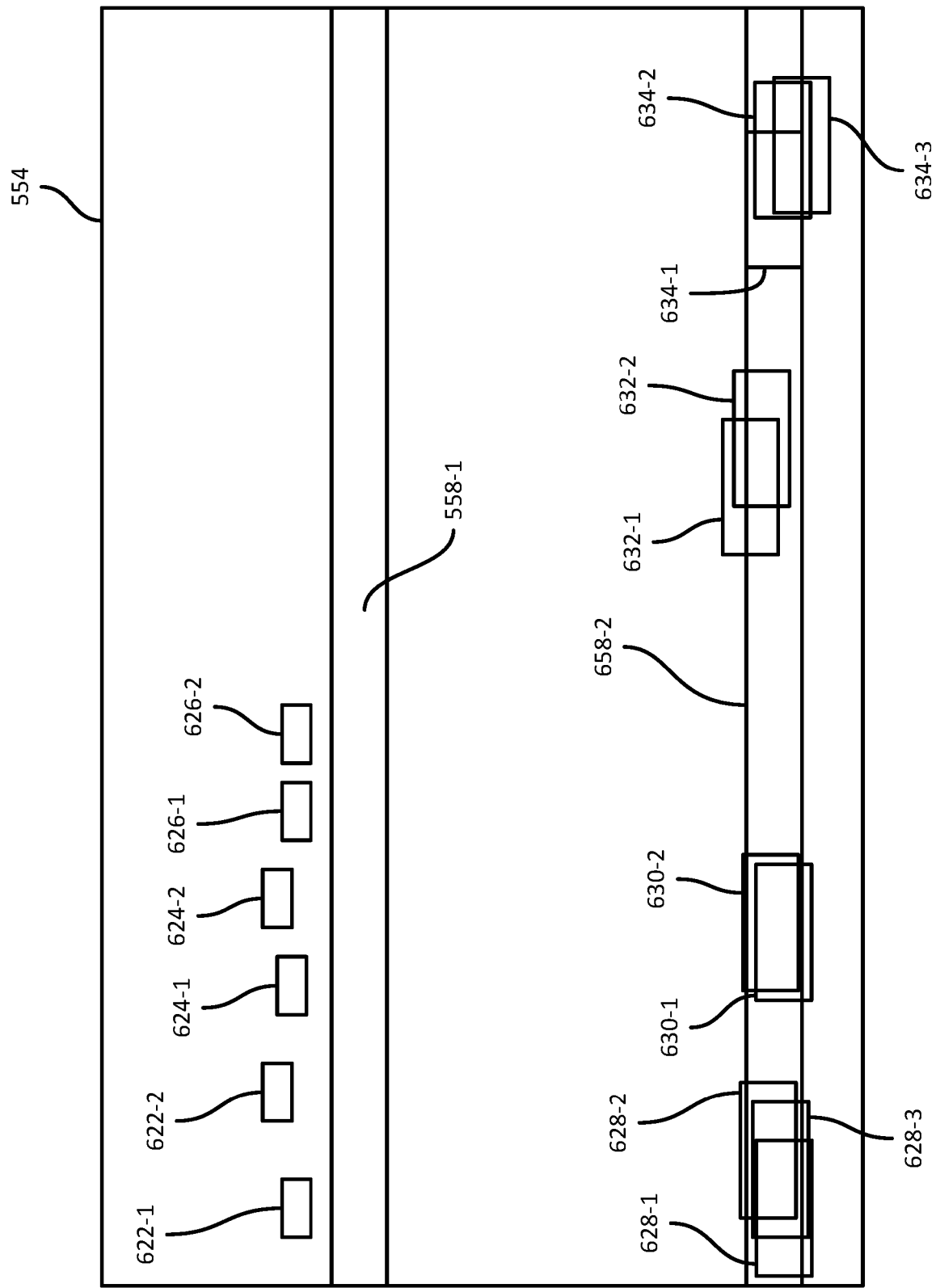
FIG. 6 depicts the initial label indicators of FIG. 5B in greater detail.

Turning to FIG. 6, the input data obtained at block 405 is shown in greater detail. In particular, the plane 554 is shown, as well as the shelf edge indicators 558-1 and 558-2. The initial label indicators 560 shown in FIG. 5B are also illustrated in greater detail. In particular, initial label indicators 622-1 and 622-2 correspond to the physical label 522 (although that fact is not currently known to the server 101). In addition, the label indicators 624-1 and 624-2 correspond to the label 524; the label indicators 626-1 and 626-2 correspond to the label 526; the label indicators 628-1, 628-2 and 628-3 correspond to the label 528; the label indicators 630-1 and 630-2 correspond to the label 530; the label indicators 632-1 and 632-2 correspond to the label 532; and the label indicators 634-1, 634-2 and 634-3 correspond to the label 534.

Returning to FIG. 4, at block 410 the server 101, and in particular the candidate subset generator 300, is configured to assign the initial label indicators to candidate subsets. Each candidate subset corresponds to a single physical label on the shelf module 510. In other words, each candidate subset of initial label indicators contains all of the detections (from multiple image frames) of a given label shown in FIG. 5A.

The assignment of initial label indicators to candidate subsets includes, in some examples, assigning each initial label indicator to a candidate subset based on decoded data included in the label indicator. As mentioned above, each label indicator can include data decoded or otherwise extracted from the portion of the image in which the label was detected. The labels may include barcodes encoding product identifiers, price information and the like. The assignment of each initial label indicator to a candidate subset may therefore include retrieving the decoded data contained in the label indicator (e.g. stored as metadata in association with the coordinates of the label indicator) and assigning the label indicator to a candidate subset corresponding to the decoded data. Thus, each initial label indicator having the same decoded data (e.g. the same product identifier) is assigned to the same candidate subset.

In some examples, however, more than one label may appear on the shelf 510 having the same barcode. In such examples, assigning initial label indicators to candidate subsets based on decoded data alone may incorrectly assign indicators corresponding to different labels to the same candidate subset. The server 101 is therefore configured, in some examples, to assign the initial label indicators to candidate subsets based both on the above-mentioned decoded data and on relative positions of the initial label indicators.

Figure 7:
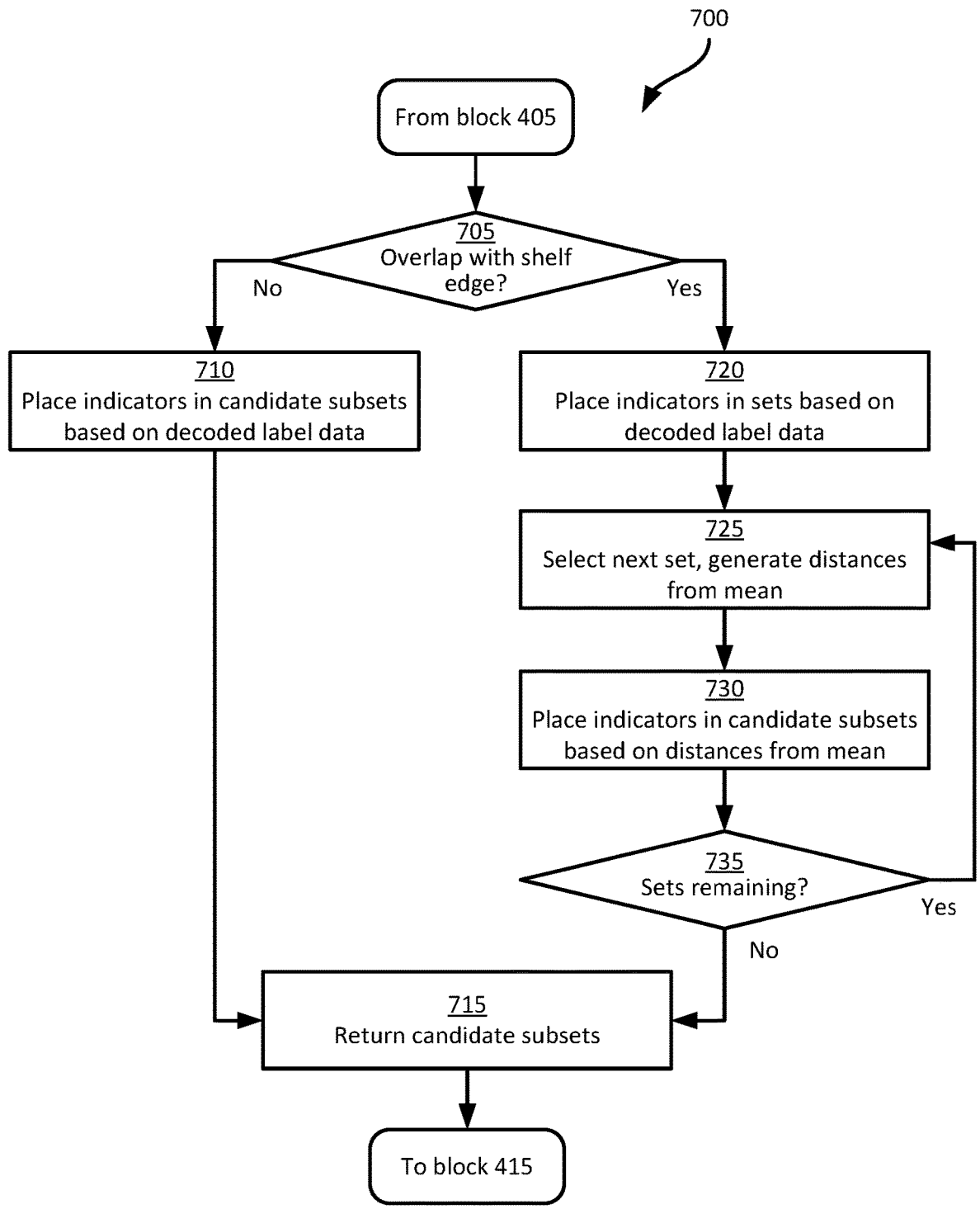
FIG. 7 is a flowchart of a method of assigning the label indicators to candidate subsets.

Turning to FIG. 7, a method 700 of assigning the label indicators to candidate subsets (i.e. of performing block 410 of the method 400) is shown. At block 705, the candidate subset generator 300 is configured to determine whether each initial label indicator overlaps with a shelf edge indicator. Any initial label indicators for which the determination at block 705 is negative are assigned to candidate subsets at block 710 based on decoded label data as mentioned above. Thus, the label indicators 622, 624 and 626 shown in FIG. 6 are assigned to candidate subsets based solely on the decoded data they each contain. In the present example it is assumed that the indicators 622 contain first decoded data, that the indicators 624 contain second decoded data, and that the indicators 626 contain third decoded data. The above-mentioned indicators are therefore assigned to three candidate subsets, with the indicators 622-1 and 622-2 corresponding to the label 522, and so on. Following generation of the above-mentioned candidate subsets, the candidate subset generator 300 is configured to return the subsets for further processing (e.g. by the depth optimizer 304) at block 715.

Figure 8A:
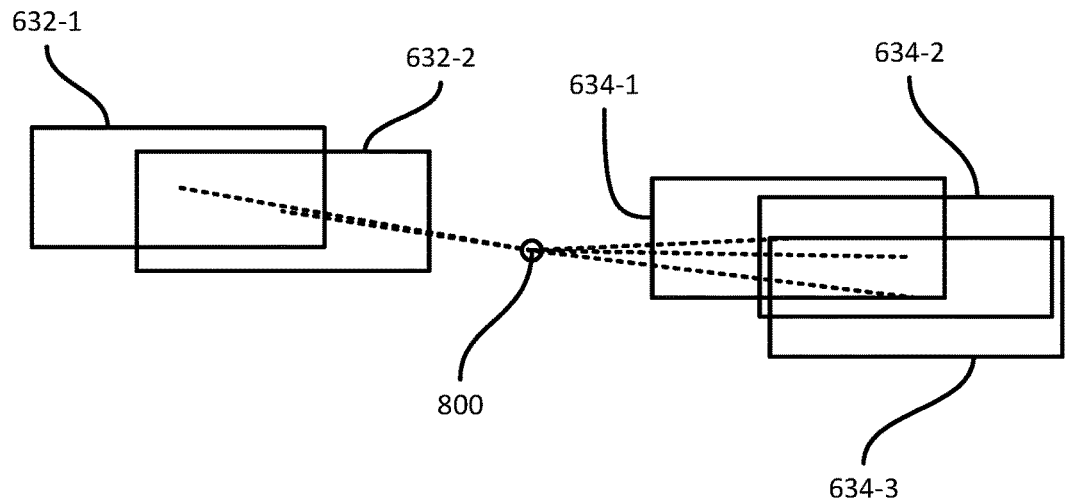
FIGS. 8A and 8B illustrate an example performance of the method of FIG. 7.

It is evident from FIG. 6 that for the remaining initial label indicators, the determination at block 705 is affirmative. Therefore, the candidate subset generator 300 proceeds to block 720 for those initial label indicators. At block 720, the generator 300 is configured to place the initial label indicators into sets based on decoded label data, as described above. Taking the initial label indicators 632 and 634, it is assumed in the present example that they all contain the same decoded data, and therefore are all placed in the same set. FIG. 8A illustrates the set resulting from the performance of block 720. As will be apparent, the set shown in FIG. 8A corresponds not to a single physical label, but to two labels, and must therefore be further subdivided.

At block 725, for each set the generator 300 determines the mean location in the frame of reference 102 (i.e. on the plane 554) of the label indicators in the set. FIG. 8A illustrates the mean location 800 of the set of label indicators that include the indicators 632 and 634. The generator 300 is also configured to determine the distance from the mean 800 to each initial label indicator (e.g. to the center of each label indicator). The above-mentioned distances are shown as dashed lines in FIG. 8A.

Figure 8B:
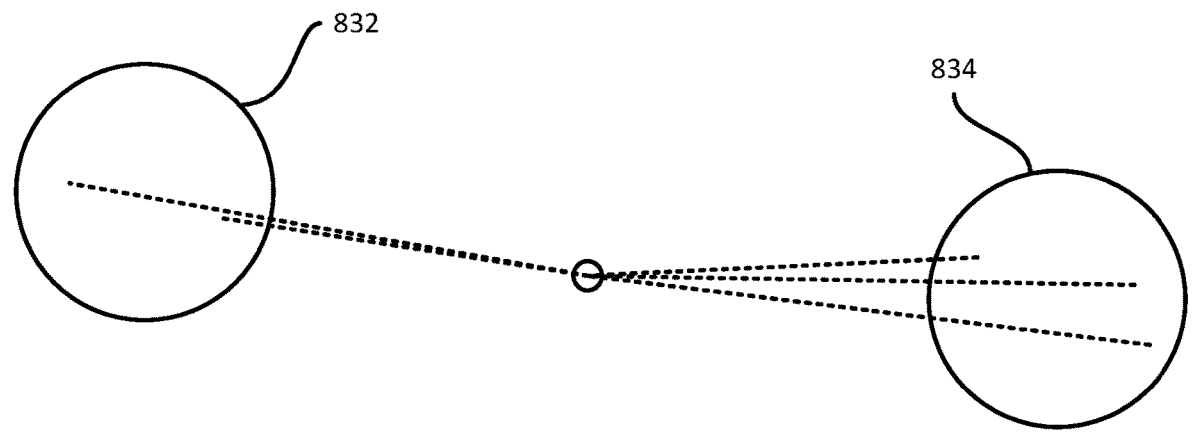

At block 730, the generator 300 is configured to place the initial label indicators of each set into candidate subsets based on the above-mentioned distances. For example, the generator 300 may be configured to group the initial label indicators in the set based on a threshold distance. FIG. 8B illustrates the application of a threshold distance (illustrated as a circle) to the distances determined in FIG. 8A, to divide the set into two candidate subsets 832 and 834 (corresponding to the initial label indicators 632 and 634, respectively). As is evident from FIG. 8B, the distances for each candidate subset 832, 834 are separated from each other by distances smaller than the threshold, but any individual member of one subset is separated from any member of the other subset by a distance greater than the threshold.

As will now be apparent to those skilled in the art, the process set out in connection with blocks 720 to 730 may not be suitable for label indicators that do not overlap with a shelf edge indicator, because such label indicators may correspond to labels mounted on pegs 520 or other structures whose actual depth deviates substantially from the depth of the plane 554. As a result, the positions of such label indicators on the plane 554 may be too inaccurate to employ mean locations and distances to assign the label indicators to subsets.

Following the performance of block 730, the generator 300 is configured to repeat the above process for each set generated at block 720 (via block 735). When each set has been subdivided into candidate subsets, the candidate subsets are returned for further processing at block 715. It is possible that a candidate subset generated via the performance of blocks 725 and 730 is identical to the set initially generated at block 720. For example, in the case of the initial label indicators 628 (which are presumed to each contain the same decoded data, different from the decoded data of any other indicators shown in FIG. 6), the above-mentioned distances may all fall within the threshold, and the initial indicators 628 are therefore assigned to a single candidate sub set.

Returning to FIG. 4, at block 415 the depth optimizer is configured to select a candidate subset for further processing. Having selected a candidate subset, the depth optimizer is configured to determine a recovered depth for the candidate subset. As noted above, the depth of all initial label indicators is the depth of the shelf plane 554. However, the actual labels represented by the initial label indicators are not necessarily at the same depth as the plane 554. As noted earlier, the depth of the peg-mounted labels 522, 524 and 526 may vary significantly from the depth of the shelf edges 518. Further, the plane 554 itself may not represent an exact fit with the shelf edges 518, and thus the depth assigned to the initial label indicators may not be accurate even for initial label indicators representing labels placed on the shelf edges 518.

The depth optimizer is configured to determine a recovered depth for each candidate subset beginning at block 420, by generating a plurality of projection sets. Each projection set includes a back-projection of each initial label indicator in the candidate subset to a different depth than the depth of the shelf plane 554. Each projection set is generated for a different one of a series of predetermined depths. For example, the series of predetermined depths may begin at the depth of the shelf plane 554 and increase in increments of 1 mm until a depth equal to the (previously known or detected from captured depth measurements) depth of the shelf back 516. A variety of other depth increments may also be contemplated, depending on the size of the shelf 510, the desired accuracy of the recovered depth, and the like.

Figure 9A:
FIGS. 9A to 9D illustrate an example performance of block 420 of the method of FIG. 4.
Figure 9B:
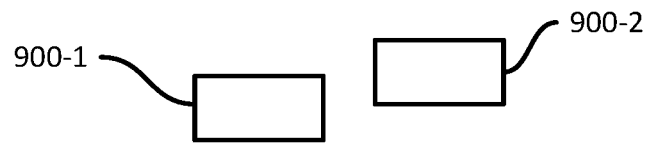
Figure 9C:
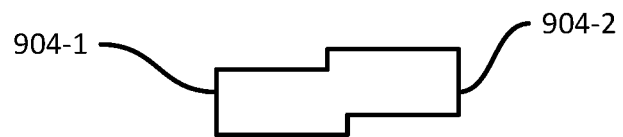
Figure 9D:

Turning to FIGS. 9A-9D, the initial label indicators 622-1 and 622-2 (both members of a single candidate subset) are shown in FIG. 9A. FIGS. 9B, 9C and 9D show successive projection sets 900-1 and 900-2, 904-1 and 904-2, and 908-1 and 908-2. Each projection set 900, 904 and 908 results from the back-projection of the label indicators 622 to a greater depth than the previous projection set (that is, the set 908 is at a greater depth than the set 904). Example projection depths, relative to the depth of the plane 554, are listed in each of FIGS. 9A-9D.

As shown in FIGS. 9A-9D, as the depth of projection increases, the projections of the indicators 622-1 and 622-2 begin to overlap. That is, the projections begin to occupy the same three-dimensional space in the frame of reference 102, which is to be expected as both indicators 622 represent the same physical label. Thus, the projection set with the greatest degree of overlap is most likely to reflect a correct depth for the indicators 622.

The optimizer 304 is therefore configured, at block 420, to also determine the aggregate surface area of each projection set (i.e. the total surface area of the projection set). At block 425, the optimizer 304 is configured to select the projection depth of the projection set with the smallest aggregate surface area. Returning to FIGS. 9A-9D, it is evident that the final projection set (FIG. 9D) has the smallest aggregate surface area among those illustrated. The optimizer 304 is therefore configured to select the depth at which the projection set 908 was generated (i.e. 30 cm beyond the depth of the plane 554, in this example).

As will now be apparent to those skilled in the art, a significant number of projection sets may be required to traverse a sufficient range of depths to identify a recovered depth that is likely to reflect the true depth of a given label. For example, using projection depths at increments of 1 mm as mentioned above, three hundred projection sets are required to arrive at the projection set 908 shown in FIG. 9D. Therefore, the optimizer 304 is configured, in some examples, to employ both coarse and fine depth increments to generate the projection sets.

Figure 10:
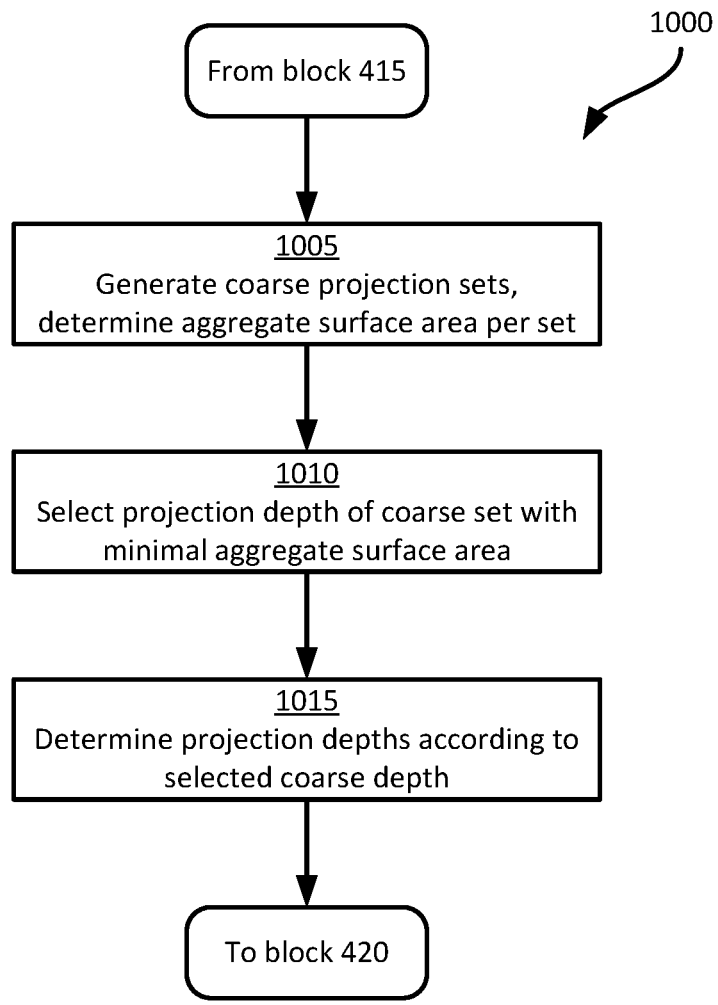
FIG. 10 is a flowchart of a method of refining projection depth for use in the method of FIG. 4.

Turning to FIG. 10, a method 1000 of refining projection depth is shown, for performance prior to block 420. In particular, at block 1005 the optimizer 304 is configured in some examples to generate a plurality of coarse projection sets and determine the aggregate surface area of each projection set. The generation of projection sets is as described above in connection with block 420, except that the depth increments separating each projection sets are larger than those employed at block 420. For example, when an increment of 1 mm is employed at block 420, an increment of 2 cm may be employed at block 1005.

At block 1010, the optimizer 308 is configured to select the depth of the coarse projection set having the smallest aggregate surface area, and at block 1015 the optimizer 304 is configured to determine the series of depths to be employed at block 420 according to the coarse depth selected at block 1010. For example, if the coarse depth selected was 24 cm relative to the plane 554, at block 1015 the optimizer 304 can be configured to generate a series of projection depths at increments of 1 mm centered at a depth of 24 cm. In some examples, the method 1000 can be employed only for certain candidate subsets. For example, the optimizer may be configured to perform the method 1000 prior to block 420 for any label indicators that do not overlap with the shelf edge indicators 568 (i.e. label indicators likely to correspond to peg-mounted labels).

Figure 11A:
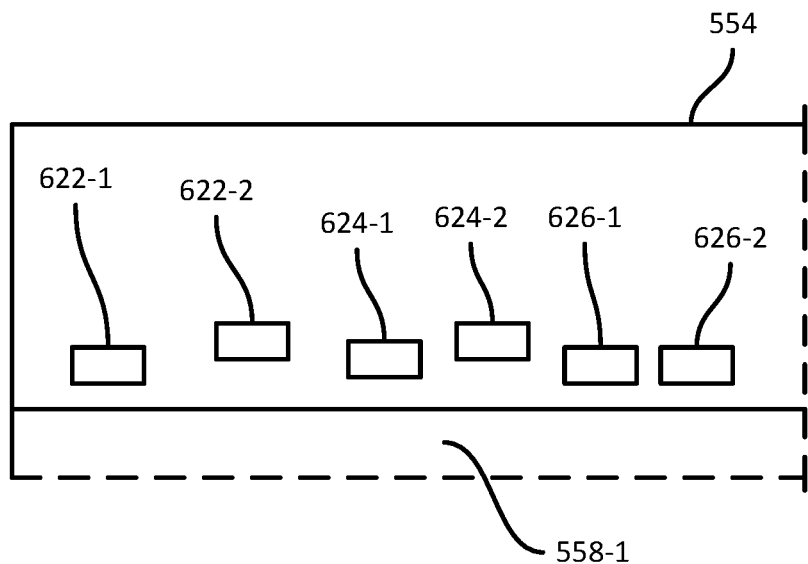
FIGS. 11A and 11B illustrate example inputs and results, respectively, of the performance of the method of FIG. 4.
Figure 11B:
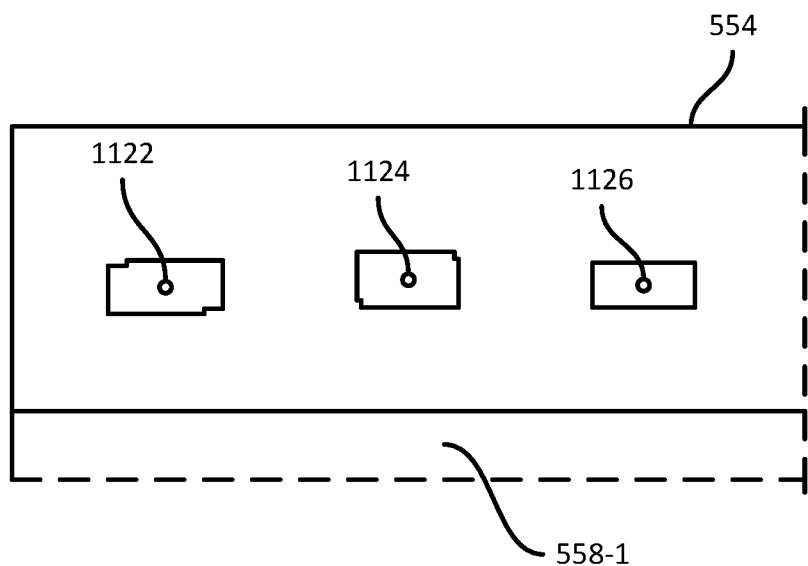

Returning to FIG. 4, at block 430 the position generator 308 is configured to generate one recovered position for the candidate subset selected at block 415, based on the recovered depth. For example, the position generator 308 can be configured to generate a recovered position including the recovered depth (i.e. along the Z axis of the frame of reference 102) as well as the coordinates (e.g. along the X and Y axes of the frame of reference 102) of the center of the aggregate surface area of the projection set selected at block 425. Turning to FIG. 11A, portions of the plane 554 and shelf edge indicator 558-1 are shown along with the label indicators 622, 624 and 626. FIG. 11B, meanwhile, illustrates back-projections 1122, 1124 and 1126 corresponding to the indicators 622, 624 and 626 respectively. The position of each back-projection 1122, 1124 and 1126 includes the depth at which each projection was generated, as well as the illustrated center of the back-projection. As is evident from a comparison of FIG. 11B with FIGS. 5A and 5B, the recovered positions of the back-projections 1122, 1124 and 1126 correspond more accurately to the positions of the labels 522, 524 and 526 respectively than do the initial label indicators 560.

Returning to FIG. 4, at block 435 the server 101 determines whether any candidate subsets remain to be processed. When the determination at block 435 is affirmative, the performance of blocks 415 to 430 are repeated for each remaining candidate subset. When the determination at block 435 is negative, the performance of method 400 proceeds to block 440, at which the recovered positions generated at block 430 are stored, for example in the repository 132.

The recovered positions may be stored, for example, in final label indicators that include not only the recovered positions, but also the decoded data mentioned above and any other data extracted from the images captured by the apparatus 103 (e.g. price information and the like). The final label indicators can include a plurality of decoded data strings, prices and the like (e.g. one for each initial label indicator from which the final label indicator was generated).

Variations to the above systems and methods are contemplated. For example, the depth optimizer 304 is configured, in some examples, to dynamically determine minimum and maximum depths for which to generate projection sets at block 420. For example, the depth optimizer can be configured to retrieve an expected actual size for a label based on the decoded data. The depth optimizer can further be configured, based on the retrieved size and the size of the initial label indicator, to determine an approximate depth error (e.g. the two sizes may indicate that the depth of the initial label indicator is likely to be about 20 cm above or below the actual depth of the label). The depths employed at block 420 (or via the method 1000) can be determined to traverse the depth so determined.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of recovering label positions in an imaging controller, the method comprising:
  receiving (i) a definition of a plane containing edges of a support structure, and (ii) a plurality of initial label indicators having locations on the plane, where an initial label indicator indicates a single physical label in one image frame of a plurality of image frames;
  assigning the plurality of initial label indicators among a plurality of candidate subsets of initial label indicators, each candidate subset of initial label indicators representing the single physical label;
  for each candidate subset of initial label indicators:
    generating, for each of a plurality of projection depths relative to the plane, a set of projections of the initial label indicators in the candidate subset of initial label indicators;

selecting, as a recovered depth for the candidate subset of initial label indicators, one of the projection depths based on the sets of projections; and generating a recovered position for the candidate subset of initial label indicators based on the recovered depth; and storing the recovered positions.

2. The method of claim 1, wherein each initial label indicator includes decoded data; and wherein assigning the initial label indicators among a plurality of candidate subsets of initial label indicators comprises assigning each initial label indicator to one of the candidate subsets of initial label indicators based on the decoded data.

3. The method of claim 2, further comprising receiving an edge indicator defining a location of an edge of the support structure in the plane;

wherein assigning the initial label indicators among a plurality of candidate subsets of initial label indicators further comprises:

for initial label indicators that overlap with the edge indicator, assigning each initial label indicator to one of the candidate subsets of initial label indicators based on the decoded data.

4. The method of claim 3, wherein the edge indicator is a shelf edge indicator.

5. The method of claim 3, wherein assigning the initial label indicators among a plurality of candidate subsets of initial label indicators further comprises, for initial label indicators that do not overlap with the edge indicator:

assigning the initial label indicators to one of a plurality of sets based on the decoded data;

determining a mean position of the initial label indicators within each set; and assigning the initial label indicators within each set to the candidate subsets of initial label indicators based on a distance from each of the initial label indicators to the mean position.

6. The method of claim 1, further comprising:

determining an aggregate surface area for each set of projections; and selecting, as the recovered depth, the one of the projection depths corresponding to a minimum aggregate surface area.

7. The method of claim 1, further comprising, prior to generating the sets of projections:

generating, for each of a plurality of coarse projection depths relative to the plane, a set of coarse projections of the initial label indicators in the candidate subset of initial label indicators;

selecting one of the coarse projection depths; and generating the plurality of projection depths based on the selected coarse projection depth.

8. The method of claim 7, wherein generating the plurality of projection depths includes adding a predetermined increment to the selected coarse projection depth.

9. The method of claim 1, wherein the support structure is one of a shelf and a table.

10. A computing device for recovering label positions, comprising:

a memory; and an imaging controller connected to the memory, the imaging controller configured to:

receive (i) a definition of a plane containing edges of a support structure, and (ii) a plurality of initial label indicators having locations on the plane, where an initial label indicator indicates a single physical label in one image frame of a plurality of image frames;

assign the plurality of initial label indicators among a plurality of candidate subsets of initial label indicators, each candidate subset of initial label indicators representing the single physical label;

for each candidate subset of initial label indicators:

generate, for each of a plurality of projection depths relative to the plane, a set of projections of the initial label indicators in the candidate subset of initial label indicators;

select, as a recovered depth for the candidate subset of initial label indicators, one of the projection depths based on the sets of projections; and generate a recovered position for the candidate subset of initial label indicators based on the recovered depth; and the imaging controller further configured to store the recovered positions in the memory.

11. The computing device of claim 10, wherein each initial label indicator includes decoded data; and wherein the imaging controller is further configured to assign the initial label indicators among a plurality of candidate subsets of initial label indicators by assigning each initial label indicator to one of the candidate subsets based on the decoded data.

12. The computing device of claim 11, wherein the imaging controller is further configured to:

receive an edge indicator defining a location of an edge of the support structure in the plane;

assign the initial label indicators among a plurality of candidate subsets of initial label indicators further by:

for initial label indicators that overlap with the edge indicator, assigning each initial label indicator to one of the candidate subsets of initial label indicators based on the decoded data.

13. The computing device of claim 12, wherein the edge indicator is a shelf edge indicator.

14. The computing device of claim 12, wherein the imaging controller is further configured to assign the initial label indicators among a plurality of candidate subsets of initial label indicators by, for initial label indicators that do not overlap with the edge indicator:

assigning the initial label indicators to one of a plurality of sets based on the decoded data;

determining a mean position of the initial label indicators within each set; and assigning the initial label indicators within each set to the candidate subsets of initial label indicators based on a distance from each of the initial label indicators to the mean position.

15. The computing device of claim 10, wherein the imaging controller is further configured to:

determine an aggregate surface area for each set of projections; and select, as the recovered depth, the one of the projection depths corresponding to a minimum aggregate surface area.

16. The computing device of claim 10, wherein the imaging controller is further configured to, prior to generating the sets of projections:

generate, for each of a plurality of coarse projection depths relative to the plane, a set of coarse projections of the initial label indicators in the candidate subset of initial label indicators;

select one of the coarse projection depths; and wherein the imaging controller is further configured to generate the plurality of projection depths based on the selected coarse projection depth.

17. The computing device of claim 16, wherein the imaging controller is further configured to generate the plurality of projection depths by adding a predetermined increment to the selected coarse projection depth.

18. The computing device of claim 10, wherein the support structure is one of a shelf and a table.

* * * * *